(12) United States Patent
Bazinet

(10) Patent No.: US 6,543,487 B2
(45) Date of Patent: Apr. 8, 2003

(54) METHOD OF SECURING A CURING COMPOSITE SUBSTRATE WRAP TO A STRUCTURE

(75) Inventor: Steve R. Bazinet, El Monte, CA (US)

(73) Assignee: Air Logistics Corporation, Pasadena, CA (US)

( * ) Notice: Subject to any disclaimer, the term of this patent is extended or adjusted under 35 U.S.C. 154(b) by 63 days.

(21) Appl. No.: 09/779,263

(22) Filed: Feb. 8, 2001

(65) Prior Publication Data
US 2002/0106464 A1 Aug. 8, 2002

(51) Int. Cl.⁷ ............................... F16L 55/16
(52) U.S. Cl. .................. 138/99; 138/97; 156/162; 156/172; 156/187
(58) Field of Search ................. 138/97, 98, 99; 156/94, 162, 171, 172, 187, 229

(56) References Cited

U.S. PATENT DOCUMENTS

| | | | |
|---|---|---|---|
| 878,719 A | | 2/1908 | Gardyne |
| 1,420,027 A | | 6/1922 | Ehrman et al. |
| 1,658,343 A | * | 2/1928 | Kloh |
| 1,691,810 A | * | 11/1928 | Itzerott .................... 24/301 |
| 2,924,546 A | * | 2/1960 | Shaw ......................... 138/99 |
| 3,358,898 A | * | 12/1967 | Medkeff et al. ............. 138/99 |
| 3,496,963 A | * | 2/1970 | Bardgette et al. ........... 138/99 |
| 3,857,140 A | * | 12/1974 | Leveen ........................ 602/78 |
| 4,283,238 A | * | 8/1981 | Jacquemart .................. 156/49 |
| 4,504,086 A | * | 3/1985 | Carrow ....................... 285/156 |
| 4,756,337 A | * | 7/1988 | Settineri ...................... 138/99 |
| 5,002,093 A | | 3/1991 | Connolly, Jr. ............... 138/99 |
| 5,027,862 A | * | 7/1991 | Laybourn .................... 138/99 |
| 5,043,033 A | * | 8/1991 | Fyfe ........................... 156/71 |
| 5,814,387 A | | 9/1998 | Orihara et al. .............. 428/63 |
| 5,894,864 A | * | 4/1999 | Rich ........................... 138/99 |
| 5,913,335 A | * | 6/1999 | Lyall ........................... 138/97 |
| 6,219,991 B1 | * | 4/2001 | Salek-Nejad ............... 52/741.3 |

FOREIGN PATENT DOCUMENTS

| | | |
|---|---|---|
| GB | 12662 | 4/1901 |
| IT | 406551 | 12/1943 |
| IT | 432786 | 3/1948 |

* cited by examiner

Primary Examiner—James Hook
(74) Attorney, Agent, or Firm—Christie, Parker & Hale, LLP

(57) ABSTRACT

A wrapped and curing substrate is secured: with a strap. The strap has two clips, each having a prong. The prong of a first clip is slid in a first direction into a first portion of the wrapped substrate. A second clip is pulled away from the first clip over a substrate edge, and the prong of the second clip is slid into a second portion of the wrapped substrate in a direction opposite the first direction. In one embodiment, the first portion of the wrapped substrate is an overlapping layer of substrate, and the second portion of the wrapped substrate is the layer of substrate extending from underneath the overlapping substrate.

23 Claims, 2 Drawing Sheets

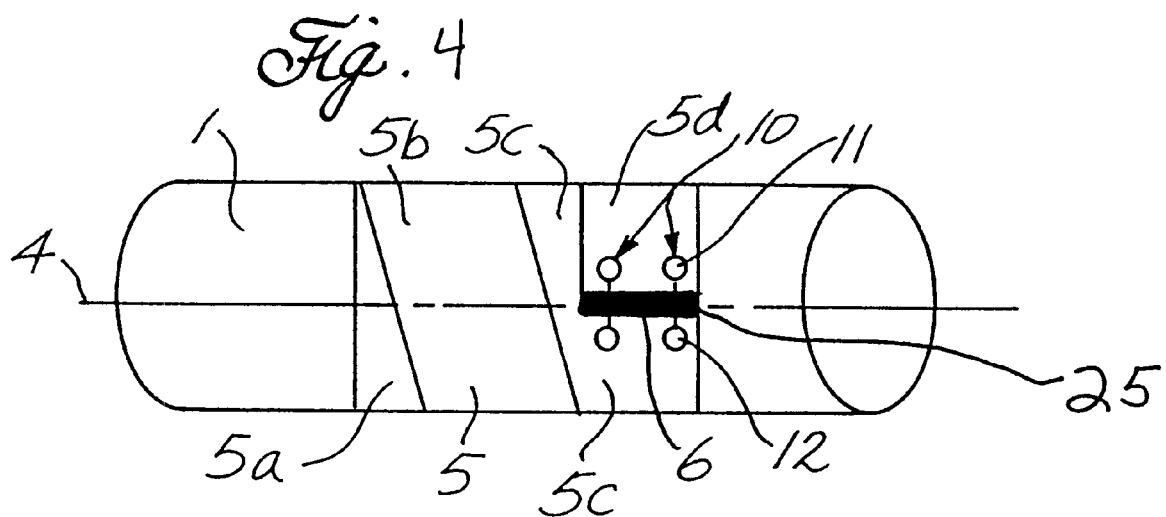

METHOD OF SECURING A CURING COMPOSITE SUBSTRATE WRAP TO A STRUCTURE

FIELD OF THE INVENTION

This invention relates to a method of securing a curing composite wrap material wrapped about a structure. In particular, this invention relates to securing a substrate to a cylindrical or rectangular block structure, such as a pipe, or column, using at least one strap with clips to hook into and connect the substrate to an overlapping layer of substrate, thereby affecting a repair both by allowing the substrate to cure without peeling away from the pipe, column or structure and by creating additional tension on the substrate during the cure cycle. An end edge of the substrate may be more firmly secured along its full length by placing a plastic bar under the strap.

BACKGROUND OF THE INVENTION

Pipe systems provide basic utilities to the public, such as water, gas, petroleum, and sewage. These basic utilities and petroleum pipeline operators are often heavily relied upon by the public. As such, the pipe systems are usually in a state of full operation, i.e. optimal flow rate.

Pipelines and other cylindrical or rectangular block structures, whether above ground or below, submerged or partially submerged, occasionally suffer damage. Over time, these structures can be damaged from rust, corrosion or other degradation. The damage can also occur during repair or installation of the structure, for example from tool impact or falling debris.

The damage to the pipe usually results in a reduced flow rate. At the damaged area of the pipe, there is a smaller cross-sectional thickness of the pipe. The thickness of the pipe is inversely proportional to the hoop stress of the pipe, i.e. the circumferential stress in the pipe due to the operational fluid pressures in the pipe. Accordingly, there is a larger hoop stress in the damaged area as compared to the rest of the pipe.

The hoop stress in the pipe is proportional to the strain in the pipe. Therefore, the larger hoop stress in the damaged area results in a proportionally larger strain. The larger strain in the damaged area of the pipe causes further damage. Consequently, to minimize the potential damage to the pipe, the pressure in the pipe is lowered which reduces the flow through the pipe until the pipe is repaired or replaced. However, flow reduction is undesirable because the utility service is correspondingly reduced. There is usually a very limited amount of time that the pipes and pipe systems can operate at the reduced flow rate, while not seriously affecting utility service.

It is often more cost effective to permanently repair the leaking or damaged pipe rather than replace it. When the damaged pipe is replaced, the downtime of the system, the labor costs, the material costs, as well as the costs associated with the loss of utility services are often large.

An expedient method of repair involves, at least in part, applying a structural reinforcement by way of wrapping the structure with a flexible repair substrate. Such flexible substrates are commonly tapes (defined principally by films), woven fabrics, and non-woven fabrics. Non-woven fabrics are characterized by the non-parallel, random organization of the component fibers, for example, paper. The flexible substrates are often used in conjunction with various adhesives, resins, putties, and fill materials. The sum of the various components is a composite substrate. The composite substrate is wrapped about the pipe while the substrate is curing.

The flexible repair substrate has a characteristic tensile strength of its own. In the finished repair, the substrate is pulled or tensioned in several turns about the pipe, thus applying to the pipe a compressive force pattern which acts counter to hoop stresses created by fluid pressure in the pipe.

Because of the tight substrate wrap about the pipe, when the pipe is strained by internal fluid pressure, the repair substrate also strains proportionally to share hoop stress with the pipe. This method of repair keeps the strain and stress in the damaged area of the pipe within acceptable limits when full operational fluid pressures are applied within the pipe. If one layer of substrate cannot withstand the tension created by the shared hoop stress, additional or thicker layers of substrate are added. Overlapping adjacent layers of substrate and/or wrapping additional layers of substrate over the damaged area of the pipe provide the thicker substrate layers, and thus more strength in the repair. The overlap of the adjacent layers renders the substrate being angled relative to the central axis of the structure, or having a spiral-shape or helix-shape wrapping material about the structure. With a low helix pitch, there is a greater the amount of overlapping substrate. Conversely, with a greater helix pitch, there is a lesser amount of substrate that overlaps.

After the composite substrate is wrapped about pipe, the substrate is typically still in a state of curing. At this point, depending upon the curing stage, there is a possibility that an end edge of the substrate may not adhere to the previously wrapped layer of substrate. The end edge of the substrate then begins to peel back unless the operator holds the substrate end edge until adherence. If the end edge peels away from the pipe, the substrate will finish curing in this position, that is, where the end edge of the substrate is not in contact with the previously wrapped layer of substrate. If cured in this position, the substrate end edge will no longer be able to adhere to the previously wrapped substrate, and the repair will be compromised. In underwater applications water flow, from tides, for example, may cause the composite substrate to unwind before it cures.

The most common structures that are repaired by way of wrapping with a flexible substrate are cylindrical or rectangular box structures, such as utility poles, architectural and industrial support columns, and pipes. However, other shaped structures, with both regular and irregular cross-section, can also often be advantageously repaired by way of wrapping the structure with a flexible reinforcing substrate. Structures that may need repair may be comprised of metal, concrete, composites, fiberglass, and plastics, including polyethylene, PVC, and polyurethane.

SUMMARY OF THE INVENTION

A pressurized vessel or pipe is operated in a pressurized fluid system. A fluid in the pressurized vessel is intended to be present at a predetermined pressure. The vessel has a wall that has a condition (i.e., damage) in a localized area that creates a hoop stress that is greater than the pipe's design hoop stress at the design fluid pressure. To prevent further damage to the pipe, a flexible composite substrate is tightly wrapped and secured around the localized area of the pipe. The substrate thereby reduces the hoop stress in the localized area of the pipe.

The wrapped and curing substrate is secured with a strap. The strap has two elastically connected clips, each having prongs. The prongs of a first clip are slid in a first direction into a first portion of the wrapped substrate. A second clip is pulled away from the first clip over a substrate edge, and the prongs of the second clip are slid into a second portion of the wrapped substrate in a direction opposite the first direction. In addition to avoiding an unravel of the substrate while the substrate is curing, the clips may also add tension to the substrate. Additional holding power can be applied using several straps. Alternatively, or in addition, a tension bar is applied across the end edge of the curing substrate under the straps. The straps and/or the tension bar may be removed after cure or remain to provide the additional tensile force.

In one embodiment, the first portion of the wrapped substrate is an overlapping layer of substrate, and the second portion of the wrapped substrate is the layer of substrate protruding from underneath the overlapping substrate.

DESCRIPTION OF THE DRAWINGS

These and other features and advantages of the present invention will become appreciated as the same becomes better understood with reference to the specification, claims and drawings wherein:

FIG. 4 is a side view of a pipe repaired with a substrate using straps according to another embodiment of the present invention.

DETAILED DESCRIPTION OF THE INVENTION

Figure 1:
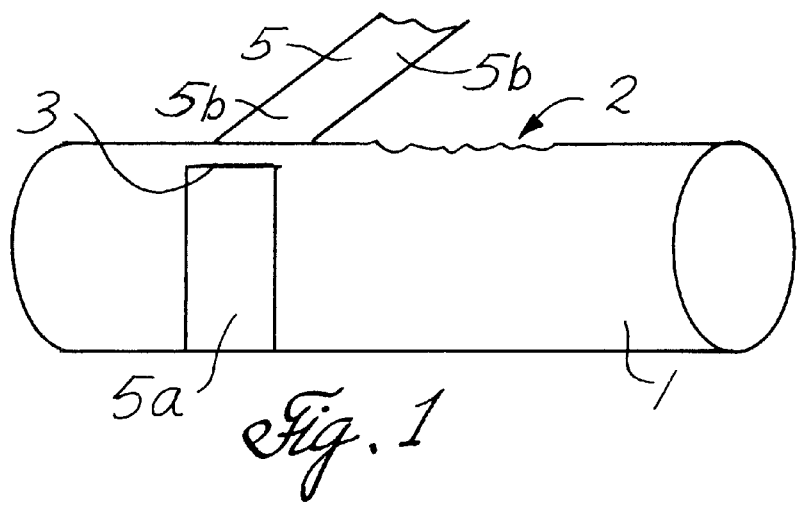
FIG. 1 is a side view of a damaged pipe that has been partially wrapped by a substrate.

FIG. 1 illustrates a cylindrical structure (or pipe) 1 with a damaged area 2 on an outside surface thereof that is in the process of being repaired according to the present invention. Illustrated in FIG. 2 is the repaired pipe 1 wrapped with a moisture-curable, resin-impregnated substrate 5 to cover the damaged area 2.

The substrate is preferably a composite substrate impregnated with a resin that is sticky or tacky. This resin helps adhere the substrate to the pipe while the substrate is pulled tightly around the pipe.

Figure 2:
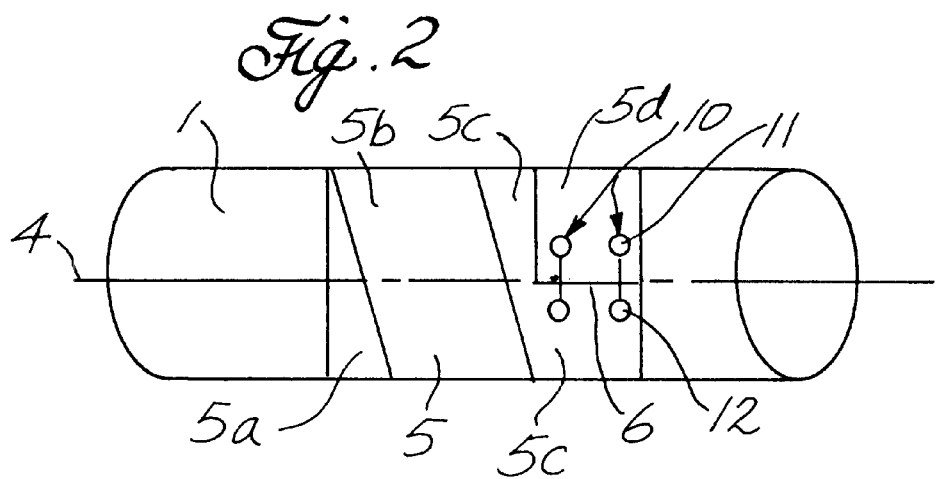
FIG. 2 is a side view of a pipe repaired with a substrate using straps according to one embodiment of the present invention.

As shown in FIG. 2, the substrate 5 is wrapped such that the substrate has adjacent layers or wraps 5a, 5b, 5c, 5d which overlap. Layers 5a, 5b, 5c each make one complete wrap about the pipe. Generally there is a consistent amount of overlap between the adjacent layers 5a, 5b, 5c, 5d, resulting in layers that are similarly angled or pitched with respect to a central axis 4 of the pipe along the length of the repair.

The substrate 5 has two end edges 3, 6 at opposite ends from each other. In a preferred embodiment, the layers 5a, 5b, 5c, and 5d are integrally coupled end to end. At a first end of the first layer 5a is the end edge 3. The layer 5b integrally couples to the layer 5a at an end opposite the end edge 3. Layers 5c and 5d likewise integrally couple to ends of layers 5b and 5c, respectively.

The end edge 3, which is adjacent layer 5a, is positioned along the pipe in an area adjacent the damaged area 2. In one embodiment, the end edge 3 is positioned along the pipe parallel to the central axis 4. Layer 5a is deposited along the pipe substantially perpendicular to the central axis 4 of the pipe. Because the substrate 5 is tacky, the end edge 3 as well as layer 5a adheres to the pipe as the entire substrate layer 5a is stretched and pulled around the pipe. Layer 5b at least partially overlaps layer 5a. In the preferred embodiment, layer 5b covers the end edge 3 so that the end edge 3 is not exposed and is less likely to peel away from the pipe. Layers 5b and 5c are spirally positioned along the pipe and they partially overlap layers 5a and 5b, respectively. In one embodiment, layer 5d is deposited along the pipe substantially perpendicular to the central axis 4 of the pipe and substantially parallel to layer 5a. Layer 5d at least partially overlaps layer 5c. At the end of layer 5d is the end edge 6. The end edge 6 overlays the layer 5c.

Figure 3:
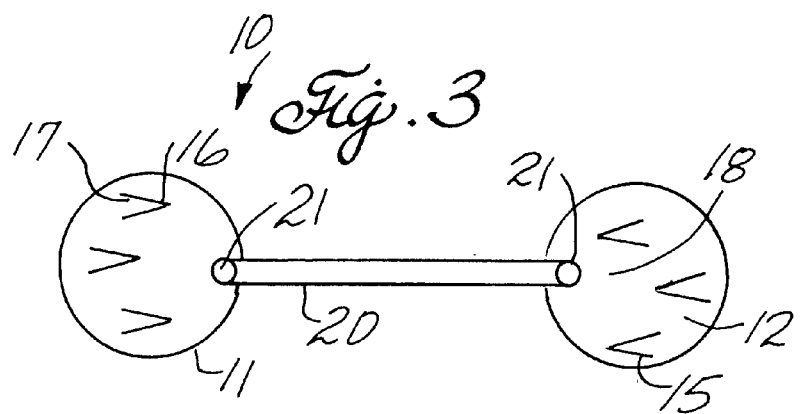
FIG. 3 is an enlarged view of one of the straps shown in FIG. 2.

In order to secure the overlapping substrate layer 5d so that the end edge 6 of the substrate 5 remains in contact therewith during cure, straps 10 are used. Each strap 10 has two elastically connected clips (or discs) 11, 12. As shown in FIG. 3, the clips 11, 12 each have a surface 18 and prongs 15 punched out from the surface 18 to form triangular-shaped fingers. Further, the clips 11, 12 each have a fastening point 21 upon which a rubber strip 20 is fastened for elastically coupling the first and second clips 11, 12 to each other. The straps 10 are thereby used to create a pair of claws on each end of a stretchable segment. In a preferred embodiment, the clips 11, 12 are round disks of sheet metal or plastic that are curved to fit the contour of the pipe. In another embodiment, the clips 11, 12 are substantially flat.

In one embodiment, there are three prongs 15 punched out from each clip. The three prongs are spaced from edges of the surface 18 and from each other at substantially equal distances. Each of the triangular shaped prongs 15 have a pointed end 16, and a base end 17 opposite the pointed end 16. The base end 17 of each of the prongs 15 remains coupled with the clip surface 18. The pointed ends 16 of each of the prongs 15 on the first clip 11 extend out from the clip surface 18 and point towards the second clip 12, and the ends 16 of the prongs 15 of the second clip 12 point toward the first clip 11. In one embodiment, the prongs 15 are substantially parallel to the clip surface 18. In another embodiment, the prongs 15 are angled from the surface 18 of the clips. The angle and quantity of the prongs vary according to a suitable holding strength, which depends upon the application.

As shown in FIG. 2, the straps 10 couple the end edge 6 of the substrate layer 5d onto the previously wrapped layer 5c of substrate. In one embodiment, the prongs 15 of the first clip 11 are slid into the overlapping substrate layer 5d near the end edge 6 of the substrate. Then, in a direction perpendicular to the central axis 4, the second clip 12 is pulled or stretched away from the first clip 11 over the end edge 6, and the prongs 15 of the second clip 12 are placed into the previously wrapped substrate layer 5c. Alternatively, the clip may be placed in layer 5c, before being placed in layer 5d.

The material for the clips 11, 12 may be any corrosion resistant material, and may include metal or plastic. The elastic material that couples the first and second clips 11, 12 may be any suitable stretchable material, such as rubber. In a preferred embodiment, the elastic material is a rubber band, and the attachment point 21 is a hole in the clip through which the rubber band attaches to the clip.

The disks can be made from various types of metal or plastic. Metals not limited to steel, aluminum, brass, copper, and stainless steels can be used for corrosion resistance or for intentional environmental degradation. The thickness for these disks is about 0.015" to 0.020" and the diameter of the disks is about 1 %16". However, both the thickness and the diameter of the disks may be increased (or decreased), for a larger (or smaller) amount of holding power (tension) in the substrate. In addition, as the number of stamped fingers increases or as the fingers lengthen, the likelihood of having a secured substrate increases.

In addition to avoiding unraveling of the substrate 5 while the substrate is curing, the straps 10 may also add tension to the substrate. As the distance between the elastically coupled clips 11, 12 increases, additional tension in the substrate, due to the tension in the rubber strip 20, increases. In an alternative embodiment, illustrated in FIG. 4, a bar 25 is positioned over the end edge 6 of the substrate, and under the rubber strip 20 coupling the clips 11, 12. The bar may be fabricated from plastic or metal.

The bar 25 holds down the substrate end edge and has a length that substantially corresponds to the length of the end edge of the substrate (i.e., the width of the substrate). The force created by the rubber strip 20 presses the bar 25 uniformly over the end edge 6, while the substrate cures. In a preferred embodiment, the bar 25 is plastic and is easily released from the substrate that has cured. In one embodiment, the bar 25 has a release coating deposited thereon to aid in the releasability of the bar from the repair.

The straps 10 may be removed after cure or remain to provide the additional tensile force. When the straps remain as part of the repair, the straps are useful in harsh environments. For example, wind and tides tend to loosen and/or move the loose ends of substrate fabric to result in unraveling of the substrate. With use of the straps, there is less likelihood of unraveling of the substrate.

The applied substrate preferably extends a desired distance in both directions along the pipe from the damaged area, so that effect of the repair on the pipe is not exclusively concentrated at the damaged area.

As explained in the Background of the Invention, the substrate undergoes a tensile stress from the tight wrap and/or the straps, and a compressive stress on the pipe results. In addition, the substrate increases the cross-sectional area of the pipe at the damaged section, which decreases the hoop stress in the pipe. Further, as the substrate is tightly wrapped about the pipe, the substrate will strain or expand the same amount as the pipe when under fluid pressure. The substrate thereby absorbs some of the hoop stress from the internal pipe pressure. These factors lead to reducing the total hoop stress on the pipe and the substrate taking some amount of the hoop stress or pressure load.

Substrates used to wrap cylindrical structures are preferably made of fiberglass and other composite fabrics impregnated or coated with resins that cure to a hard, structurally strong state within a short period of time. One example of this is a fiberglass substrate, pre-impregnated with a polyisocyanate resin which cures into a hard polyurea upon contact with water or atmospheric moisture.

A preferred resin-impregnated substrate is Aquapreg, a product of Air Logistics Corporation, Pasadena, Calif. and Dallas, Tex. (airlog.com). Aquapreg is a cloth, either woven or nonwoven, and may have unidirectional fibers impregnated with water-activatable resin. Aquapreg is useful in mold fabrication of structures, structural repairs, and pipe repairs and reinforcements. The resin impregnated in the Aquapreg substrate is a water activated polyurethane resin.

The preferred resin-impregnated substrate is made available in a vacuum sealed package because it starts to cure when exposed to atmospheric moisture, or immersed in or sprayed with water. As the substrate cures, it generally releases carbon dioxide. Usually, the substrate cures within 30 minutes of contact with water, and within 1 hour of exposure to atmospheric moisture. Preferably, the substrate is exposed to temperatures just above freezing to around 200° F. (93° C.) when curing.

After cure, the resin-impregnated substrate creates a water tight seal. The cured substrate is resistant to rust, corrosion, other chemicals such as fuel, most solvents, most acids, and alkaline substances. Also, the cured substrate is resistant to a broad range of temperatures: from about −55° F. to about 400° F.

In the present invention, the substrate neither substantially shrinks nor expands after the prestressing and curing stages. Accordingly, the repair lasts as long as the life of the pipe.

Minimal clean up or waste is associated with using substrates pre-impregnated with resin because the resin is premixed, already impregnated into the fabric. Resin-impregnated substrates offer an easily installed system, which is strong, lightweight, long lasting in severe environments, odorless and have environmentally benign reactions upon curing. In any event, due to the chemical nature of the resin impregnated substrate, protective gloves should be used when handling the substrate.

In an alternative to the substrate being resin-impregnated, the resin may be applied to the substrate by hand. However, substrates that are hand-coated with resin usually are associated with large costs and waste. The user tends to mix more resin than is needed, and tends to apply more resin to the substrate than necessary, both of which lead to waste. Additionally, the time that it takes to mix and apply, as well as clean up the resin, leads to large labor costs. Further, resins commonly used for application by hand, e.g. epoxy, phenolics and polyester, emit fumes during mixing of the adhesives.

A fiberglass substrate is formed by weaving fibers or filaments of desired characteristics. Fibers or filaments of different materials can be incorporated into the substrate. Commonly used fibers and filaments include glass, carbon, steel, kevlar, and plastic.

E-glass preferably is the glass formulation used in the fiberglass reinforcement. In alternate embodiments, the composite substrate has fibers comprised of aromatic polyamide (aramid), more particularly Kevlar® of duPont (a very strong aramid yarn), carbon, and/or metal, such as steel, titanium. The fibers provide structural strength to the substrate. However, having reinforcing fibers in both the warp direction (the circumferential direction of the pipe) and the fill direction (the weft direction opposite the warp direction) of the substrate is costly.

Because the hoop stress circumferentially around the pipe is twice the stress in the longitudinal direction, greater structural strength and reinforcement is preferably around the cylindrical pipe rather than along its length. Therefore, there are preferably more fibers in the wrapped substrate that are substantially parallel to its warp direction rather than those in the fill direction. In one embodiment, when the substrate is wrapped along the pipe with a relatively narrow bias angle (i.e., wrapped over a substantial portion of the previously wrapped layer so that the angle between the longitudinal edges of the overlapping layers is small) the fibers in the wrapped substrate are substantially parallel to the circumferential direction of the pipe. Consequently, this bias angle provides the maximum benefit of the angle of the substrate fibers. As a result, the substrate need not be applied multiple times in many different angles to provide the required repair strength.

In the present invention, the E-glass tape fabric has a warp/fill fiber ratio between 50/50 and 95/5. Preferably, the E-glass tape fabric has a warp/fill fiber ratio between 60/40 and 75/25.

Preferably, the substrate uses specially designed weaves and materials to provide significant strength, stiffness and cost advantages over standard glass cloth. The weave of the fiber has a high density, so that leaks in the material are sealed. The fibers in the fabric can be woven together with a nylon thread. In alternative embodiments, the fibers in the fabric can be braided, or thermally stitched. The process of weaving allows a set of yarns or fibers running in the warp direction to be interlaced with another set of yarns or fibers running across the fill. In one embodiment, criss-cross 45 degree patterns and longitudinal stitching are used, so that the fibers are heavily biased in the warp direction.

The substrate fabric is manufactured in large sheet rolls. The substrate fabric is then cut into workable pieces. Either the pieces cut from the middle of the ream or at the end of the ream (called the 'selvage') can be used effectively as the substrate in the present invention.

The substrate (without the resin) can have a weight of about 6 oz to 24 oz per square yard. However, typically the cloth composite (with the resin) is at least about 9 oz per square yard, but rarely over about 36 oz per square yard.

The surface of the damaged area is preferably prepared before applying the substrate to the pipe. The surface is prepared by using emery paper or another substance to clean and/or roughen the damaged area before the substrate is applied in order to improve adhesion.

An advantage of the above described pipe repair is that the pipe can be repaired while under either partial pressure or the then—acceptable operational pressure. There is no need to shut down the flow of fluid through pipe in order to repair the pipe as is usual in pipe repair.

While the invention is disclosed in conjunction with the specific embodiments thereof, it is to be evident that many alternatives, modifications, and variations will be apparent to those skilled in the art in light of the foregoing description. It should readily be understood that the embodiments described and illustrated herein are illustrative only, and are not to be considered as limitations upon the scope of the present invention. Variations and modifications may be made in accordance with the spirit and scope of the present invention.

For instance, it is understood that the scope of the present invention could similarly encompass substrate materials which are highly inelastic, resistant to stretch.

It is also understood that the scope of the present invention could encompass various types and positioning of the straps, including that of the clips and prongs. For instance, the straps may not be positioned substantially perpendicular to the central axis 4 of the pipe, in that the straps 10 couple the end edge 6 of layer 5d of the substrate onto the layer 5a or 5b of substrate. In other embodiments, the shape of the clips may be triangular, square, or another various shape. The surface 18 of the clips may be substantially flat. There may be more than three prongs 15, or even one or two prongs in the clips.

In an alternative embodiment, the clips 11, 12 are coupled with any suitable biasing mechanism. The biasing mechanism includes at least one of a spring, a spring material, an elastic material or any other known biasing means.

The repair method of the present invention also encompasses repairing generally cylindrical and rectangular block structures or vessels, such as telephone or utility poles, architectural and industrial support columns, beams and columns of buildings and bridge structures, and pipelines as described in the Background of the Invention. Other structures or vessels, with either a regular or an irregular cross-section, can also often be advantageously repaired by wrapping the structure with a flexible reinforcing composite substrate. It is also understood that the scope of the present invention could encompass repair for damage to an inside surface of the vessel, rather than an outside surface. Accordingly, it is intended to embrace all such alternatives, modifications and variations as falling within the spirit and broad scope of the appended claims.

What is claimed is:

1. A method of securing a curing substrate that is wrapped about a structure, the method comprising:

sliding a prong of a first clip of a strap into a first portion of the wrapped substrate, wherein the prong is slid in a first direction;

pulling a second clip, that is coupled with the first clip, away from the first clip over a substrate edge;

positioning a bar over the substrate edge and under the strap; and sliding a prong of the second clip into a second portion of the wrapped substrate, wherein the prong is slid in a direction opposite the first direction, wherein the clips secure the substrate in position during cure of the substrate.

2. The method of claim 1 wherein the first portion of the wrapped substrate is an overlapping layer of substrate, and the second portion of the wrapped substrate is a layer of substrate that extends from underneath the overlapping substrate.

3. The method of claim 1 wherein the clips provide tension in the substrate so that the substrate remains in tension during cure.

4. The method of claim 1 wherein the clips are made of a corrosion resistant material.

5. The method of claim 1 wherein the clips are made of a biodegradable material.

6. The method of claim 1 wherein the clips are curved to fit the contour of the structure wrapped by the substrate.

7. The method of claim 1 wherein the clips are capable of being removed when the substrate is cured.

8. The method of claim 1 wherein the clips are coupled with elastic material.

9. The method of claim 8 wherein the elastic material is a rubber strip.

10. The method of claim 1 wherein each prong is punched out from the clips and has a triangle shape, wherein each triangular shaped prong has a pointed end, and a base end opposite the pointed end, wherein the base end of each prong is coupled with a surface of the clips.

11. The method of claim 10 wherein the pointed end of the prong on the first clip points toward the second clip.

12. The method of claim 1 wherein there is at least one prong in each clip.

13. The method of claim 12 wherein there are three prongs spaced from each other on each clip.

14. The method of claim 12 wherein there are more than three prongs in each clip.

15. The method of claim 1 wherein the flexible substrate is a fiberglass fabric impregnated with a moisture-curable resin.

16. The method of claim 1 wherein the flexible substrate is a substrate with an epoxy resin.

17. The method of claim 1 wherein the flexible substrate is a substrate with a phenolic resin.

18. The method of claim 1 wherein the flexible substrate is a substrate with a polyester resin.

19. The method of claim 1 wherein the bar is plastic.

20. The method of claim 1 wherein the bar is releasable from the cured substrate.

21. A method of connecting an underlying layer of a composite substrate to an end edge of an overlapping layer that overlaps the underlying layer of substrate, the method comprising:
   sliding prongs of a first clip of a strap into the overlapping layer of the substrate near the end edge thereof, wherein the prongs are slid in a first direction toward the end edge;
   pulling a second clip, that is coupled with the first clip, over the end edge and away from the first clip;
   positioning a bar over the substrate edge and under the strap; and
   sliding prongs of the second clip into the underlying substrate layer, wherein the prongs are slid toward the end edge in a second direction which is opposite the first direction,
   wherein the clips secure the substrate during cure of the substrate.

22. A combination of a curing substrate and a strap securing the curing substrate, the combination comprising:
   a composite substrate that is wrapped about a structure wherein an overlapping layer of the substrate is wrapped over an underlying layer of the substrate, wherein an end of the overlapping layer is an end of the substrate;
   a strap having a first clip and a second clip coupled to the first clip, wherein each clip has prongs; and
   a bar positioned over the substrate end and under the strap;
   wherein the prongs of the first clip are slid in a first direction into the overlapping layer of the substrate near the end of the substrate, the second clip is stretched away from the first clip and the prongs of the second clip are slid into the underlying layer of the substrate in a second direction that is opposite the first direction,
   wherein when the substrate is curing the clips secure the end of the overlapping layer of substrate to the underlying layer of substrate and the bar holds down the substrate end.

23. A method of repairing a damaged area of a cylindrical structure comprising:
   wrapping a strip of flexible substrate around a damaged area of the cylindrical structure at least once;
   positioning a bar over an edge of the substrate; and
   strapping an end of the substrate to a previously wrapped layer of substrate.

* * * * *